United States Patent [19]

Dale et al.

[11] 4,387,019
[45] Jun. 7, 1983

[54] ALUMINUM CAN RECLAMATION METHOD

[75] Inventors: Kenneth H. Dale, Powhatan; Walter G. Ludwig, Chesterfield County, both of Va.

[73] Assignee: Reynolds Metals Company, Richmond, Va.

[21] Appl. No.: 337,109

[22] Filed: Jan. 5, 1982

[51] Int. Cl.³ ............................................. B03B 7/00
[52] U.S. Cl. ...................................... 209/12; 209/19; 209/38; 209/44; 209/44.3; 209/930; 209/683; 110/220
[58] Field of Search ................... 209/12, 19, 683, 687, 209/38–40, 629, 631, 634, 44, 930, 44.3, 44.1, 44.2; 110/220

[56] References Cited

U.S. PATENT DOCUMENTS

| 188,641 | 3/1877 | Kurth . |
| 210,817 | 12/1878 | Stevens . |
| 1,987,640 | 1/1935 | Rothgarn . |
| 2,257,470 | 9/1941 | Marchant . |
| 2,318,976 | 5/1943 | Stevens . |
| 2,358,506 | 9/1944 | Guthrie . |
| 2,788,124 | 4/1957 | Miller . |
| 2,964,181 | 12/1960 | Demarest et al. . |
| 3,005,548 | 10/1961 | Flanders et al. . |
| 3,044,619 | 7/1962 | Knolle . |
| 3,107,475 | 10/1963 | Gustafson . |
| 3,311,234 | 3/1967 | Rumpf et al. . |
| 3,435,950 | 4/1969 | Suverkrop . |
| 3,612,271 | 10/1971 | Behling . |
| 3,647,062 | 3/1972 | Cancel et al. . |
| 3,730,325 | 5/1973 | Goodwin . |
| 3,736,120 | 5/1973 | Tempe . |
| 3,738,483 | 6/1973 | MacKenzie . |
| 3,771,647 | 11/1973 | Cumpston . |
| 3,799,338 | 3/1974 | Duda, Jr. . |
| 3,833,117 | 9/1974 | MacKenzie et al. . |
| 3,836,085 | 9/1974 | Brown . |
| 3,856,217 | 12/1974 | Brewer . |
| 3,886,951 | 6/1975 | McRobert . |
| 3,888,351 | 6/1975 | Wilson . |
| 3,888,352 | 6/1975 | Kulseth . |
| 3,897,330 | 7/1975 | Rhys . |
| 3,917,567 | 11/1975 | Barrett . |
| 3,941,687 | 3/1976 | Peterson . |
| 4,037,474 | 7/1977 | Kost . |
| 4,043,513 | 8/1977 | Hoberg . |
| 4,077,847 | 3/1978 | Choi . |
| 4,094,772 | 6/1978 | Hillekamp et al. . |
| 4,139,454 | 2/1979 | Larson . |

FOREIGN PATENT DOCUMENTS 804493 4/1951 Fed. Rep. of Germany .
276311 7/1930 Italy .

OTHER PUBLICATIONS

Nonferrous Metals are Separated In Auto Scrap Via New Process–American Metal Market, 3/2/77, p. 11.

Primary Examiner—Bernard Nozick
Attorney, Agent, or Firm—Alan T. McDonald

[57] ABSTRACT

A method for reclaiming aluminum cans from municipal refuse is disclosed. The method includes a first screening operation to remove materials substantially larger than the cans, a second screening operation to remove material substantially smaller than the cans, a magnetic separation to remove ferrous metals, a friction-gravity separation to remove lightweight materials, an air separation to remove heavy materials and a final reclamation of aluminum cans.

10 Claims, 1 Drawing Figure

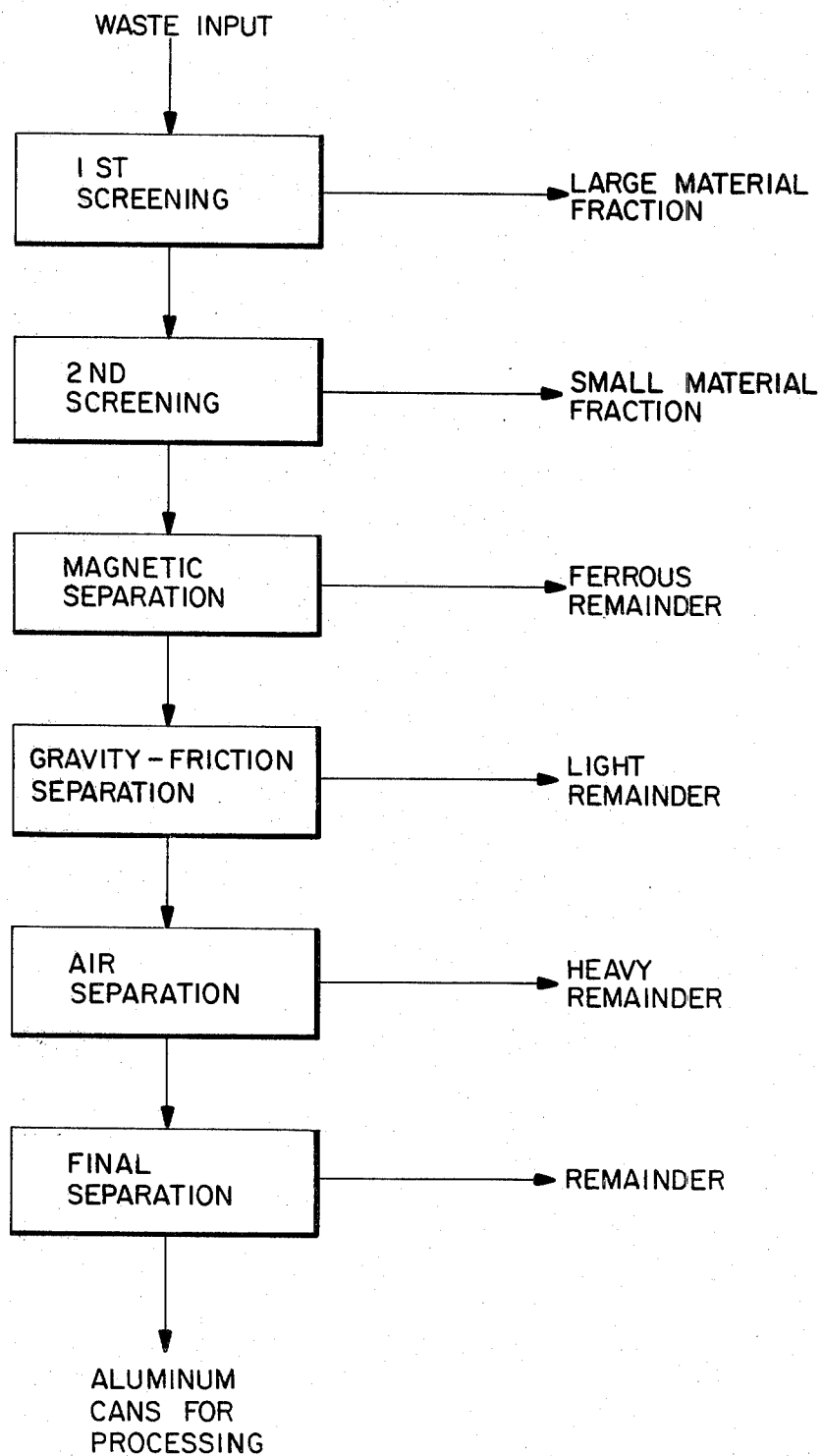

ALUMINUM CAN RECLAMATION METHOD

BACKGROUND OF THE INVENTION

Many attempts have been made to reclaim valuable materials, such as aluminum, steel, glass and the like, from municipal refuse. Many of these attempts have included such steps as screening in a rotating drum or trommel, magnetic separation, air classification by weight and the like. While such operations are each individually known, the success rate, when measured either by the percentage of valuable material recovered or by the amount of material processed for a given rate of material recovery, for a total system has been unacceptably low. Thus, the economic justification necessary for installation and commercial operation of these systems have made these systems commercially unacceptable. It is thus the primary objective of the present invention to provide a method for material recovery, and especially aluminum can recovery, from municipal waste which raises both the percentage of valuable material collected and the processing rate of the municipal refuse to levels sufficient to justify economic operation.

THE PRESENT INVENTION

By means of the present invention, a commercially acceptable aluminum can reclamation system is provided. According to the method of the present invention, municipal waste is subjected to a first screening operation where material substantially larger than cans is removed. The remaining refuse is then subjected to a second screening operation where a majority of the material substantially smaller than cans is eliminated. The remainder of the refuse is then subject to a magnetic separation in which ferrous materials, such as iron and steel, are separated, with the remaining material then being subjected to a gravity-friction separation to remove a majority of the remaining material which is lighter than aluminum cans. Next, the surviving refuse is subjected to an air separation, eliminating materials heavier than aluminum cans, and a final classification separates the aluminum cans from the remaining stream. The system not only provides substantial aluminum can recovery, but also provides for coin, glass and ferrous metal recovery and for a fuel recovery stream, notably in the form of paper, plastics and fabric, which may be burned to fuel boilers for water and/or space heating of the facility. The method of the present invention may provide a recovery rate of aluminum cans of two-thirds or more of the cans present in the original municipal waste stream and, depending upon the size of equipment chosen, may handle 80 to 100 tons per hour (72574.4 to 90718.0 kilograms per hour) or more of municipal waste input.

BRIEF DESCRIPTION OF THE DRAWING

The reclamation method of the present invention will be more fully described with reference to the FIGURE which is a schematic diagram of the flow of municipal waste through the reclamation system according to the method of the present invention.

DETAILED DESCRIPTION OF THE PREFERRED EMBODIMENT

Turning now to the FIGURE, the method of reclaiming aluminum cans and other valuable materials from municipal waste input according to the present invention is schematically illustrated. The waste to be processed is received from any of numerous sources, the most common being municipal waste as collected from residential and commercial locations by collection trucks. The trucks deliver the waste to a processing location where it is accumulated and fed to the reclamation system.

Thus, for example, municipal waste as dumped at the entrance to the recovery station may be fed, such as by means of a bulldozer, to an entry conveyor. The conveyor moves the waste to a first screening operation.

The first screening operation takes place in a rotating drum screen, commonly referred to as a trommel. The trommel is a rotating drum having a plurality of openings in its wall. The major portion of the material which is less than the hole diameter will fall through the holes, with all material having dimensions larger than the hole size passing through the drum.

When employing the present method, the first screening operation is carried out in a trommel having openings with a diameter ranging between about 5.00 and 5.75 inches (12.70 and 14.61 centimeters). The drum, for a system capable of handling approximately 80 to 100 tons per hour (72574.4 to 90718.0 kilograms per hour), has a length ranging between about 50.0 to 60.0 feet (15.24 to 18.29 meters) and has a diameter of about 10.0 to 20.0 feet (3.05 to 3.66 meters). The drum may further be equipped with lifting bars to help in mixing the waste material for improved screening. The first trommel is downwardly inclined at an angle from about 2° to 5°, aiding in movement of the waste material through the drum. The drum is operated at a speed which is slightly less than the critical speed necessary for centrifugal force to overcome gravity. This provides good mixing and large drop forces to aid in bag opening. Thus for example, the first trommel drum may operate at between about 9 to 20 revolutions per minute.

The first screening operation thus permits material which is less than the hole diameter to pass through the screen to a collection source, such as a conveyor, and forces the material which does not pass through the screen to the end of the drum for its collection. Because of the selected opening size in the first trommel screen, the majority of cans will pass through the openings. Thus, it is the screened out fraction which will be further processed.

There is some loss of some cans in this first screening operation, due to some garbage bags which may fail to open, some cans which become entangled with other large material, and the like. To reduce the bag opening problem, the drum may be equipped with inwardly facing spikes along a portion of its length, such as, for example, the first 33% of its length, to aid in bag opening. Chains may also be positioned over the spikes, and appropriately attached to the drum, to ride along the spikes as the drum rotates. These chains help to avoid build-up on the spikes, avoid clogging of the openings, and act as a flail to aid in bag opening. However, as is the case with any screening operation, some material will be lost.

The material passing to the end of the trommel drum comprises a majority of fabric, paper, plastics, cardboard, and other combustibles. This large material fraction, which may comprise as much as about one-half of the total waste input, may be disposed of, such as by accumulation and removal to an appropriate landfill site, or, this fraction may be employed as fuel for boilers to provide heat and hot water to the plant facility, thus increasing the value of the incoming waste stream.

The fraction which passed through the screen of the first trommel is conveyed to a second screening operation. The second screening operation also takes place in a rotating trommel drum. This drum has openings ranging between about 2.00 to 2.50 inches (5.08 to 6.35 centimeters), which is less than any dimension of standard beverage cans. Thus, while it is possible that some highly crushed cans may be screened out at this position, the overwhelming majority of cans will not pass through the second trommel screen.

Again, using the 80 to 100 ton per hour (72574.4 to 90718.0 kilogram per hour) example, the second trommel may have a length ranging between about 15.0 to 25.0 feet (4.57 to 7.62 meters) and may have a screen drum diameter of between about 4.0 to 8.0 feet (1.22 to 2.44 meters).

The second trommel is also downwardly inclined at an angle ranging between about 2° to 5° and the drum is again operated at a speed slightly below its critical speed, for example, from about 14 to 25 revolutions per minute.

The fraction which passes through the second trommel screen, which may comprise up to about 20% of the initial waste input, may be removed to landfill or may be further processed. This fraction will include small metal parts, coins, broken glass, and other small items. The metallics, coins and glass may be recovered by techniques well-known to those skilled in the art, such as water cyclones and the like.

In the past, the two screening operations of the first and second trommel screens were attempted in a single operation. In such an operation, a single trommel, having a plurality of smaller openings followed by a plurality of larger openings, was employed, with the material passing through the drum and through the first set of openings being discarded, and with the material passing through the larger openings of the screen being further processed. However, such a system was found to be inefficient, due to the inability to finely screen the small material, resulting in a larger amount of screening to be done in a smaller area of large holes, giving a lower large opening screen output and thus a larger loss of cans.

The fraction of material which has passed through the large openings of the first trommel and which did not pass through the openings of the second trommel is the high can fraction. This fraction now contains objects of sizes closely resembling can bodies, but differing in structure, weight and materials. The subsequent separations are designed to eliminate these extraneous materials from the can bodies.

Following the second trommel the remaining fraction is transported, such as by a conveyor, past a magnetic separation station. This station may, for example, comprise an overhead magnetic belt which will pull magnetic materials, such as steel cans and other remaining iron and steel materials, from the material passing under it. The steel may then be discarded, or, to again heighten the value of the waste input, this ferrous material may be reclaimed. This ferrous fraction may comprise, for example, up to about 4% of the initial refuse input.

The remaining fraction is next classified by means of gravity and friction. The material on the conveyor is transferred, for example, to a vibrating pan and stream splitter. Thus, for example, the material from a 3.0 foot (0.9 meter) conveyor may be transferred to an 8.0 foot (2.4 meter) wide vibrating pan, which spreads the material more thinly and levels the material, to enable ease of separation in the next separation operation. The vibrations of the pan also move the material from its entrance to the exit point of the pan.

The material exiting the pan falls over a lip at the pan exit point onto a friction slide. While a single slide may be employed, it is preferred that a plurality of frictions slides be positioned adjacent to one another, each of which handles a portion of the remaining material from the vibrating pan. The friction slides each comprise a belt which is positioned at an angle from about 15° to 30° above the horizontal and which is driven upwardly toward the vibrating pan. Further, the friction slides are positioned under the vibrating pan so that the can weight or heavier material falling from the pan, which material is given a greater exiting velocity by the pan than the lighter material, impinges the slide on the lower one-third thereof.

The driven belt, which has a metal or other solid backing plate over which the belt rides, is formed of a high fraction material, such as polyurethane, and is driven at a linear rate of from about 200 to 400 feet per minute (61.0 to 121.9 meters per minute).

At this station, materials such as can bodies and heavier materials will bounce and roll down the slide, being collected for further operation, and the majority of the remaining light materials, such as paper cups, sticks, and other similar materials, are removed from the stream. These materials may be discarded or they may be added to the fuel fraction previously mentioned. This fraction may comprise, for example, up to about 20% of the initial waste input.

The remaining fraction comprises mostly aluminum cans and materials heavier than the aluminum cans, such as fruits, filled cans, and other similar materials, with some remaining light materials. To eliminate the "heavies", an air knife classification is next employed.

The remaining fraction is cascaded from a generally horizontal conveyor to a lower generally horizontal conveyor. An air knife, which is an air stream moving at a velocity between about 6,000 and 10,000 feet per minute (1828.8 to 3048.0 meters per minute), is directed in a direction generally perpendicular to the downwardly inclined direction of travel of the fraction. The air velocity, angle and conveyor speed are adjusted to lift the can bodies and remaining materials lighter than can bodies over a barrier and into a collection stream, with the materials heavier than can bodies falling to the lower conveyor. This air knife could also be the system as disclosed in U.S. Pat. No. 3,749,240, and thus include an additional magnetic separation. This fraction may be discarded or may be added to the fuel stream previously disclosed. This fraction may comprise, for example, up to about 3.5% of the initial waste input.

Finally, the cans, now mixed only with some light materials, such as paper cups and the like which has made it through the stream with the cans, are separated. This may be done by hand, or may be accomplished by means of a linear induction motor, which attracts non-ferrous metallics, as is known in the art, or by other well-known techniques. The cans may be crushed, flattened and/or shredded and collected for submission to a reclamation facility for melt down and reuse. The can fraction may comprise, for example, up to about 0.5% of the initial waste input and the remaining material up to about 2.5% of the initial waste input. This last fraction may be discarded or may also be added to the fuel stream.

Employment of the system of the present invention should recover approximately two-thirds of the cans in the original waste stream. When added to the possibilities for glass, coin and ferrous metal reclamation and the use of significant amounts of the remaining refuse as fuel for the plant facility, it is clear that the system of the present invention provides economical and efficient resource and recovery system.

While presently preferred embodiments of the invention have been illustrated and described, it is not intended to be so limited thereby, except as set forth in the accompanying claims.

We claim:

1. A method of reclaiming cans from waste material comprising screening said waste material to produce a large material fraction and a first remainder fraction, screening said first remainder fraction to produce a small material fraction and a second remainder fraction, magnetically classifying said second remainder fraction to produce a magnetic fraction and a third remainder fraction, gravitationally and frictionally classifying said third remainder fraction to produce a light material fraction and a fourth remainder fraction, air classifying said fourth remainder fraction to produce a heavy material fraction and a fifth remainder fraction and finally classifying said fifth remainder fraction to produce an aluminum can fraction and a final remainder fraction.

2. The method of claim 1 wherein said finally classifying comprises hand picking.

3. The method of claim 1 wherein said finally classifying comprises eddy current separating.

4. The method of claim 1 further comprising employing at least one of said large material fraction, said light material fraction, said heavy material fraction and/or said final remainder fraction as fuel for a facility employing said method.

5. The method of claim 1 wherein said screenings are each accomplished in a trommel.

6. The method of claim 1 wherein said magnetic classifying is accomplished by means of an overhead magnetic belt.

7. The method of claim 1 wherein said gravitational and frictional classifying is accomplished by means of a friction slide.

8. The method of claim 1 wherein said air classifying is accomplished by means of an air knife.

9. The method of claim 1 further comprising classifying said small material fraction to recover glass, coins and/or magnetics.

10. The method of claim 9 wherein said small material friction classifying is accomplished in a water cyclone.

* * * * *